United States Patent [19]

Nordyke et al.

[11] 3,852,087
[45] Dec. 3, 1974

[54] COMPOSITE PIGMENT FOR BLOCKING TANNIN

[76] Inventors: John S. Nordyke, 440 Sulgrave Rd., Pittsburgh, Pa. 15211; William C. Spangenberg, 236 Parker Dr., Mt. Lebanon, Pa. 15216

[22] Filed: Jan. 28, 1974

[21] Appl. No.: 436,975

Related U.S. Application Data

[63] Continuation-in-part of Ser. No. 236,955, March 22, 1972, abandoned.

[52] U.S. Cl............ 106/288 B, 106/300, 106/299, 106/292, 106/296, 106/308 B, 106/306
[51] Int. Cl............................................. C08h 17/04
[58] Field of Search........ 106/288 B, 299, 306, 300, 106/308 B, 296, 292

[56] References Cited
UNITED STATES PATENTS

| | | | |
|---|---|---|---|
| 3,545,993 | 12/1970 | Warner | 106/288 B |
| 3,576,657 | 4/1971 | Cohn et al. | 106/288 B |
| 3,650,793 | 3/1972 | Goodspeed et al. | 106/308 B |
| 3,726,700 | 4/1973 | Wildt | 106/308 B |

*Primary Examiner*—Delbert E. Gantz
*Assistant Examiner*—J. V. Howard
*Attorney, Agent, or Firm*—Sabin C. Bronson

[57] ABSTRACT

A new method of treatment of pigments and water-thinnable paints to enhance their ability to render tannins insoluble is described. By this means, greater protection is provided against the migration of water soluble tannins contained in most types of wood, (but notably cedar and redwood), through a paint film and discoloring the surface. The treating or doping agents may be any of the amphoteric compounds, but notably the hydroxides or hydrates of alumina, titania, zirconia, silica or zinc. These may be used as addition agents to water-thinnable paints, or to one or more of the pigments contained in those paints. Our preferred method of use is to incorporate the amphoteric hydrates into certain of the composite pigments described in our application Ser. No. 182,241, abandoned in view of continuation-in-part application Ser. No. 285,323, filed Aug. 31, 1972 now U.S. Pat. No. 3,817,998.

14 Claims, No Drawings

COMPOSITE PIGMENT FOR BLOCKING TANNIN

CROSS-REFERENCE TO RELATED APPLICATION

This application is a continuation-in-part of our copending application Ser. No. 236,955, filed Mar. 22, 1972 now abandoned.

BACKGROUND OF THE INVENTION

In our copending application Ser. No. 236,955, we described a new type of composite pigment, non-toxic in nature. Pigments of this type possess corrosion inhibitive and protective properties when used in paints and coatings. They also possess the ability to react with and inhibit migration of tannin through water-based paint coatings, thus helping to combat unsightly staining.

In that application, we described and claimed composite pigments comprising a base pigment which might be wollastonite, talc or mica, in the presence of which was formed and on the surface of which was deposited an additive compound which in synergy with the base pigment gives properties of corrosion protection, toughness and adherence of coatings, and tannin absorption beyond the powers of the constituents, either singly or as simple mixtures. The additive compounds which we described were compounds of calcium oxide with boric acid and with phosphoric acid.

SUMMARY OF THE INVENTION

In our continuing study of the nature and chemistry of tannins and of the function of these composite pigments as absorbers or blockers of tannin migration and staining, we have found that certain modifications can be made to them to improve their capacity to perform this function. We have found that the members of a class of chemical compounds, amphoteric in nature, especially amphoteric hydroxides, have a strong affinity for tannins and tannic acid, forming insoluble complexes. These materials, when added to a water-based paint composition, as doping compounds, have the power to render the tannins insoluble and to inhibit their migration through the paint film and thereby causing unsightly stain on the surface. We have also found that where they are used as additives or doping agents for our composite pigments, the results are superior to those achieved when the compound is simply added to the paint. We believe that this is due to the fact that when these materials are added to the composite pigment composition according to our process, at the time of pigment manufacture, all of the additive materials are coated upon the base pigment in amorphous form and achieve a vastly greater surface area and exposure than if they were present as a simple admixture. (See scanning electron micrographs.)

We have found, moreover, that effectiveness of our amphoteric additive compounds is related to the pigment with which they are used. Thus, the doping compounds of the invention are particularly effective when employed with certain of the composite pigments described in our copending application Ser. No. 285,323.

It has been found, in accordance with the invention, that a beneficial tannin migration blocking effect is obtainable with as little as about 5% of the doping compound based on total pigment weight. The practical upper limit is represented by a percentage above which further increments of doping agent are of diminishing effectiveness, and which percentage is sufficient to effect substantially complete tannin blockage. There is an apparent optimum value in blocking tannin when the amount of doping compound present is in the range of about 10% to about 20% by weight of the total pigment weight present. While more could be used, we consider the use of more than about 30% to be economically unfeasible since no additional benefit could be expected to compensate for the increased cost. In addition to cost, a high level of doping results in increasing the amount of water required for wetting so that a paint becomes difficult to make, and its shelf life is adversely affected. Preferably, about 10% by weight of doping agent, based on total pigment weight, is employed.

The amphoteric compounds which we have found to be useful for tannin blocking are those of aluminum, silicon, titanium, zirconium, zinc, lead, vanadium and iron. The anionic compounds which contain these elements — the aluminates, silicates, titanates, zirconates, zincates, plumbates, vanadates and ferrates — are effective if they are only slightly soluble in water. Insoluble compounds do not function, whereas those of high solubility do not serve as stable pigments in a water-based system. The amphoteric compounds which appear to be most effective and which we prefer to use are the hydroxides or hydrates. The vanadates and ferrates, while potentially useful, are essentially eliminated from serious consideration because of their dark color which would make them unsuitable for use in white or light colored paints. The plumbates are eliminated from use in paints for housing by Public Law No. 91-695 and later directives issued by the Department of Health, Education, and Welfare. This leaves for preference and primary consideration the appropriate compounds of aluminum, silicon, titanium, zirconium and zinc.

We have found that silica hydrate may be added to the paint or to the pigment when it is formed. In the case of the pigment, silica hydrate may be added separately to the pigment batch, or it may be formed by reaction upon and partial decomposition of the silicate mineral with a suitable acid. In this way, a portion of the mineral is reacted upon leaving a major portion of it unaffected. The reaction products are silica hydrate and a salt of the acid used. In the case of wollastonite, the calcium salt of the acid would be formed; or in the case of the talc, the magnesium salt would be formed. These salts when soluble may be removed by decantation or filtration. The silica hydrate formed by this means is effective in reacting with tannin.

There are many combinations of pigments and doping agents which we can use effectively within the scope of our invention. We may, for example, simply add a quantity of titania hydrate, alumina hydrate, silica hydrate, zirconia hydrate, zinc hydrate, or a mixture of two or more of these to an existing paint formula, and achieve a measure of value in improving reaction with tannin and in blocking tannin migration. We can add a quantity of water soluble aluminate, silicate, titanate, zirconate or zincate in a like manner to an existing paint formula.

DESCRIPTION OF THE PREFERRED EMBODIMENTS

In addition, other examples of our invention comprise the addition of the amphoteric doping compounds to pigments during their manufacture. The following examples represent some of the many ways in which our invention may be put into practice. In each case where one amphoteric compound is named, another might have been used.

EXAMPLE NO. 1

Paint Formulation

| | Parts by Weight |
|---|---|
| Titanium dioxide | 140.0 |
| Composite pigment | 140.0 |
| Titanium hydroxide, 35% solids | 40.0 |
| Tamol 850 | 4.0 |
| Triton X102 | 0.8 |
| Nopco NXZ | 1.6 |
| Metasol 57 (100%) | 1.5 |
| Ethylene glycol | 20.5 |
| Pine oil | 2.4 |
| Cellosize solution | 48.0 |
| Aerosol OT | 3.2 |
| AC 34 resin | 410.0 |
| Water | 120.0 |

The addition of the titanium hydroxide to an existing paint formula, with a reduction in the amount of titanium dioxide used, resulted in improvement in the tannin blocking power of the paint coating.

EXAMPLE NO. 2

Pigment

The raw materials are mixed in a vessel equipped with a stirring device, having a capacity of 5,700 liters. First, 1,891 liters of water are pumped into the mixture vessel. To this is added successively, with continuous stirring, 689 kg of wollastonite, 98 kg of slaked lime containing 73.4% CaO and 154.2 kg of phosphoric acid containing 75% $H_2PO_5$. The 98 kg of lime is equivalent to 66.2 kg of CaO, while the 154.2 kg of phosphoric acid solution is equivalent to 83.8 kg of $P_2O_5$. After all visible signs of reaction are completed, add 240 kg of titania hydrate paste containing 35% solids or 84 kg of titania hydroxide on a dry basis. The slurry is stirred briefly and is then pumped into a pebble mill. This mill has a volume capacity of 6,435 liters and is equipped with a charge of dense alumina pebbles occupying about 55% of the apparent mill volume. The mill is put into operation for a period of 2 to 4 hours, after which the contents are drained, dewatered, dried, and ground by suitable means. Specific gravity of the pigment is 2.74. The color is white.

EXAMPLE NO. 3

700 kg of wollastonite is added to the mixing vessel described above, and 1,640 liters of water is added. To the slurry of wollastonite in water is added 112.5 kg of slaked lime containing 81.0 kg CaO and 94.5 kg of boric acid containing 98% of $B_2O_3$. The stirring is continued until all visible signs of reaction have subsided; at which point is added 109 kg of alumina hydrate containing 65% $Al(OH)_3$ and 2 kg of glacial acetic acid. After a brief period of stirring, the slurry is pumped from the mixer to a pebble mill such as that described in Example No. 2, or other device suitable for applying extended grinding or attrition. The mill is put into operation for a period of 2 to 4 hours, after which the contents are drained, dewatered, dried, and pulverized. Specific gravity of the pigment is 2.68. The color is white.

The pigments of Examples No. 2 and No. 3 have shown a significantly greater power to react with and to block tannin migration than the pigments made without the addition of titania hydrate or alumina hydrate, as the case may be. This is similarly the case if zirconia hydrate, silica hydrate or zinc hydrate had been used. They are particularly well suited for use in waterbased wood primer formulations.

EXAMPLE NO. 4

640 kg of either a micaceous type of talc or 640 kg of mica is added to the mixer with 2,500 liters of water. To this, with continued stirring, is added 85.5 kg of zinc oxide and 137 kg of phosphoric acid containing 75% $H_3PO_4$. Stirring is continued until signs of reaction are complete. To this is added 120 kg of titania hydrate paste containing 35% solids and 100 kg of alumina hydrate containing 65% solids. After a few minutes of continued sitrring, the slurry is pumped into the pebble mill previously described and is subjected to attrition for a period of 2 to 4 hours. The slurry is then drained, dewatered, dried, and pulverized. Specific gravity of the pigment is 2.83. The color is white.

The pigment produced in this example is best suited for water-based top coats for use on wood. Not only is it a good pigment for blocking tannin staining, but it also has other desirable properties comparable in some ways and superior in others to zinc oxide which is frequently used in wood paint top coat formulations.

EXAMPLE NO. 5

1,000 kg of wollastonite is added in a mixing vessel to 1,640 liters of hot water whose initial temperature is approximately 95°C. To the resulting slurry is added 65 kg of glacial acetic acid. Mixing is continued for one-half hour after addition of the acid. The slurry is then pumped to a pebble mill. The mill is put into operation for a period of 2 to 4 hours, after which the product is drained, dewatered, dried and ground by suitable means. Specific gravity of the product is 2.65. The color is white, with very low hiding power.

The pigments whose manufacture is described in examples number 2, 3, 4 and 5, along with other composite or simple pigments doped with the amphoteric compounds, especially amphoteric hydroxide, of our invention, are uniformly superior in their tannin blocking power to similar pigments without such doping.

What is claimed is:

1. The method of rendering a water-based paint capable of inhibiting the migration of tannins through paint coatings when applied to the surface of wood which contains tannins, comprising incorporating into a pigment-containing water-based paint composition an amount of at least one amphoteric metal hydrate effective to insolubilize and thereby inhibit the migration of said tannins through said paint coating.

2. The method of claim 1 in which said amphoteric metal hydrate is selected from the group consisting of a hydrate of alumina, titania, zinc, zirconia and silica.

3. The method of claim 1 in which said amphoteric metal hydrate is in the form of an amphoteric salt.

4. The method of claim 1 in which the amount of amphoteric metal hydrate is between about 5% and about 30% by weight of the total pigment weight present.

5. A pigment-containing water-based paint composition for application to the surface of wood which contains tannins, to inhibit the migration of tannins from the wood into paint coatings applied thereto, said composition including at least one amphoteric metal hydrate in an amount effective to insolubilize and thereby inhibit the migration of said tannins through said paint coating.

6. The composition of claim 5 in which said amphoteric metal hydrate is selected from the group consisting of a hydrate of alumina, titania, zinc, zirconia and silica.

7. The method of rendering a pigment consisting essentially of a composite of wollastonite base and a compound selected from the group consisting of calcium phosphate and calcium borate, capable of combining with and insolubilizing wood-derived tannins when said pigment is applied to a wood surface as a component of a water-based paint, which comprises incorporating with said pigment at least one amphoteric metal hydrate in an amount effective to combine with and to insolubilize said tannins.

8. A paint pigment consisting essentially of a composite of wollastonite base and a compound selected from the group consisting of calcium phosphate and calcium borate and having incorporated therein between about 5% and about 30% by weight of at least one amphoteric metal hydrate capable of combining with and insolubilizing a wood-derived tannin when said pigment is contacted with said tannin.

9. The method of claim 7 in which said amphoteric metal hydrate is selected from the group consisting of a hydrate of alumina, titania, zinc, zirconia and silica.

10. The method of claim 7 in which said amphoteric metal hydrate is in the form of an amphoteric salt.

11. The composition of claim 8 in which said amphoteric metal hydrate is selected from the group consisting of a hydrate of alumina, titania, zinc, zirconia and silica.

12. The composition of claim 8 in which said amphoteric metal hydrate is in the form of an amphoteric salt.

13. The composition of claim 5 in which the amount of amphoteric metal hydrate is between about 5% and about 30% by weight of the total pigment weight present.

14. The method of claim 7 in which the amount of amphoteric metal hydrate is between about 5% and about 30% by weight of the total pigment weight present.

* * * * *

UNITED STATES PATENT OFFICE
CERTIFICATE OF CORRECTION

Patent No. 3,852,087             Dated December 3, 1974

Inventor(s) John S. Nordyke and William C. Spangenberg

It is certified that error appears in the above-identified patent and that said Letters Patent are hereby corrected as shown below:

In Column 3, under Example No. 2, line 7, the reference to 75% "$H_2PO_5$" should be $H_3PO_4$.

Signed and sealed this 8th day of April 1975.

(SEAL)
Attest:

RUTH C. MASON
Attesting Officer

C. MARSHALL DANN
Commissioner of Patents
and Trademarks